(12) United States Patent
Moquin et al.

(10) Patent No.: US 7,031,455 B2
(45) Date of Patent: Apr. 18, 2006

(54) USE OF HANDSET MICROPHONE TO ENHANCE SPEAKERPHONE LOUDSPEAKER PERFORMANCE

(75) Inventors: Philippe Moquin, Kanata (CA); Ed Gancarcik, Ottawa (CA)

(73) Assignee: Mitel Networks Corporation, (CA)

( * ) Notice: Subject to any disclaimer, the term of this patent is extended or adjusted under 35 U.S.C. 154(b) by 625 days.

(21) Appl. No.: 09/972,063

(22) Filed: Oct. 7, 2001

(65) Prior Publication Data

US 2002/0106077 A1    Aug. 8, 2002

(30) Foreign Application Priority Data

Oct. 5, 2000    (GB) .................................... 0024350

(51) Int. Cl.
    *H04M 1/00*    (2006.01)
    *H04M 9/00*    (2006.01)

(52) U.S. Cl. ............................. 379/388.07; 379/388.02

(58) Field of Classification Search .......... 379/387.01, 379/406.01–406.16, 388.02, 388.07, 444; 381/71.1–71.14
    See application file for complete search history.

(56) References Cited

U.S. PATENT DOCUMENTS

| | | | |
|---|---|---|---|
| 3,798,374 A | | 3/1974 | Meyers |
| 4,115,659 A | * | 9/1978 | Spanel et al. .......... 379/406.03 |
| 4,629,829 A | * | 12/1986 | Puhl et al. ................... 455/570 |
| 5,410,595 A | | 4/1995 | Park et al. |
| 5,680,450 A | | 10/1997 | Dent et al. |
| 5,896,452 A | * | 4/1999 | Yip et al. ............... 379/406.01 |
| 5,912,967 A | | 6/1999 | Gaffney et al. |

FOREIGN PATENT DOCUMENTS

| | | |
|---|---|---|
| CA | 2229424 | 2/1998 |
| GB | 2326797 | 12/1998 |
| GB | 2366932 | 3/2002 |

OTHER PUBLICATIONS

Mingsian R. Bai and Hsinping Wu, "Robust Control of a Sensorless Bass-Enhanced Moving-Coil Loudspeaker System", The Journal of the Acoustical Society of America, vol./Issue: 105, Jun. 1999, pp. 3283-3289.

* cited by examiner

*Primary Examiner*—Curtis Kuntz
*Assistant Examiner*—Alexander Jamal
(74) *Attorney, Agent, or Firm*—Jones Day

(57) ABSTRACT

A speakerphone incorporates a portion defining a loudspeaker cavity, the cavity containing a loudspeaker. The speakerphone also includes a handset with an internal microphone in the handset. The speakerphone has a housing adapted to receive the handset, and when it is thus received, the handset microphone is acoustically coupled to the loudspeaker cavity, allowing the handset microphone signal to be used to control feed-back or feed-forward algorithms that enhance the performance of the speakerphone.

12 Claims, 3 Drawing Sheets

USE OF HANDSET MICROPHONE TO ENHANCE SPEAKERPHONE LOUDSPEAKER PERFORMANCE

This invention relates generally to an improvement for enhancing the acoustical performance of the speakerphone in sets, and takes advantage of the fact that the handset microphone is normally available and unused when the speakerphone loudspeaker is utilized.

BACKGROUND OF THIS INVENTION

To control loudspeaker variability, some manufacturers test every loudspeaker in their production. This test ensures a nominal speaker and enclosure variability. A reasonably large tolerance window or high cost loud speaker is required to obtain a reasonable pass rate.

To boost speaker performance, electrical equalisation is often applied. However, this can only be an average curve since individual adjustment would be prohibitively expensive.

At high power levels or any other times where a speaker may exhibit non-linearities, few if any inexpensive solutions exist. One solution in high power, high performance systems is to mount an accelerometer on the speaker driver, and use a feedback system to linearise the driver. Myers discloses such a system in U.S. Pat. No. 3,798,374, issued on Mar. 19, 1974.

In attempting to avoid such costs, other convoluted circuitry has been used to monitor the drive signal of the loudspeaker. This added circuitry adds to the expense and a great deal must be known about the driver before it can yield any useful information. Bai and Wu describe such a circuit in "*Robust Control of a Sensorless Bass-Enhanced Moving-Coil Loudspeaker System*", J. Acoust. Soc. Am. 105(6) pp. 3283–3289.

It is evident that, if one wants to avoid non-linearities (adaptive acoustic echo cancellers do not tolerate them), a cost penalty is imposed. This cost penalty comes about either as increased component cost, increased test time, reduced production yield, extra transducers, or extra circuitry. Even with these extra costs, non-linearities are unavoidable since clipping, buzzes and rattles are still possible.

GENERAL DESCRIPTION OF THIS INVENTION

An aspect of the present invention is the ability to compensate for loudspeaker variability, enclosure variability, and non-linearities in the circuitry and the loudspeaker. A further aspect is the ability to enhance the loudspeaker performance at low frequencies and high power. Still further, the invention can enhance the performance of acoustic echo cancellers used in full-duplex speakerphones. These aims are attained by using existing telephone hardware with the addition of an acoustical waveguide (acoustic coupling) which is expected to be a very inexpensive part.

The unique aspect of this invention is its use of existing transducers and circuitry to provide feed-back or feed-forward control of one or more circuit or hardware characteristics. The latter could include a loudspeaker itself, the acoustic echo canceller, a voice recognition system (if present) and any other hands-free telephony operation that could be improved by the use of such a signal.

The handset is rarely in use while the loudspeaker is emitting sound. If the loudspeaker cavity is coupled to the handset microphone, it becomes possible to use the signal created at the microphone to control various feed-back or feed-forward algorithms that enhance the performance of the speakerphone. The handset typically has its own CODEC, so that the only part that is not already implemented on most telephones is an acoustic coupler between the handset microphone and the loudspeaker cavity. The provision of such acoustic coupler is simple and cheap.

One of the side benefits to be gained from this improvement involves designing the waveguide so as to provide an elastomeric seal against the handset. By doing so it is possible to minimize the likelihood of the handset rattling when the loud speaker is in operation.

More particularly, this invention provides, in a speakerphone having a portion defining a loudspeaker cavity containing a loudspeaker, the speakerphone including a handset having an internal microphone, said portion of the speakerphone defining means for receiving the handset, the improvement comprising acoustically coupling the handset microphone to said loudspeaker cavity, so that the resulting handset microphone signal can be used to control feed-back or feed-forward algorithms that enhance the performance of the speakerphone.

Furthermore, this invention provides, in a speakerphone having a portion defining a loudspeaker cavity containing a loudspeaker, the speakerphone including a handset with a handset cavity enclosing an internal microphone, said portion of the speakerphone defining registry means for receiving the handset, the improvement comprising coupling means for acoustically coupling the handset microphone to said loudspeaker cavity whenever the handset is received by said registry means, so that the handset microphone signal can be used to control feed-back or feed-forward algorithms that enhance the performance of the speakerphone.

Still further, this invention provides a speakerphone comprising
 a portion defining a loudspeaker cavity,
 a loudspeaker within said cavity,
 a handset,
 an internal microphone in the handset,
 means on said portion of the speakerphone for receiving the handset, and coupling means for acoustically coupling the handset microphone to said loudspeaker cavity, so that the handset microphone signal can be used to control feed-back or feed-forward algorithms that enhance the performance of the speakerphone.

Again, this invention provides, for a speakerphone having a portion defining a loudspeaker cavity containing a loudspeaker, the speakerphone including a handset having an internal microphone, said portion of the speakerphone defining receiving means for receiving the handset, a method of exerting control over at least one aspect of the circuitry of the speakerphone, comprising acoustically coupling the handset microphone to said loudspeaker cavity whenever the handset is received by the receiving means, and using the resultant microphone signal to accomplish such control.

Yet further, this invention provides, for use with a speakerphone having a portion defining a loudspeaker cavity containing a loudspeaker, the speakerphone including a handset with a handset cavity enclosing an internal microphone, said portion of the speakerphone defining receiving means for receiving the handset:
 a method of controlling at least one aspect of the speakerphone circuitry, comprising acoustically coupling the handset microphone to said loudspeaker cavity whenever the handset is received by the receiving means, and using the resultant microphone signal to control feed-back or feedforward algorithms that enhance the performance of the speakerphone.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
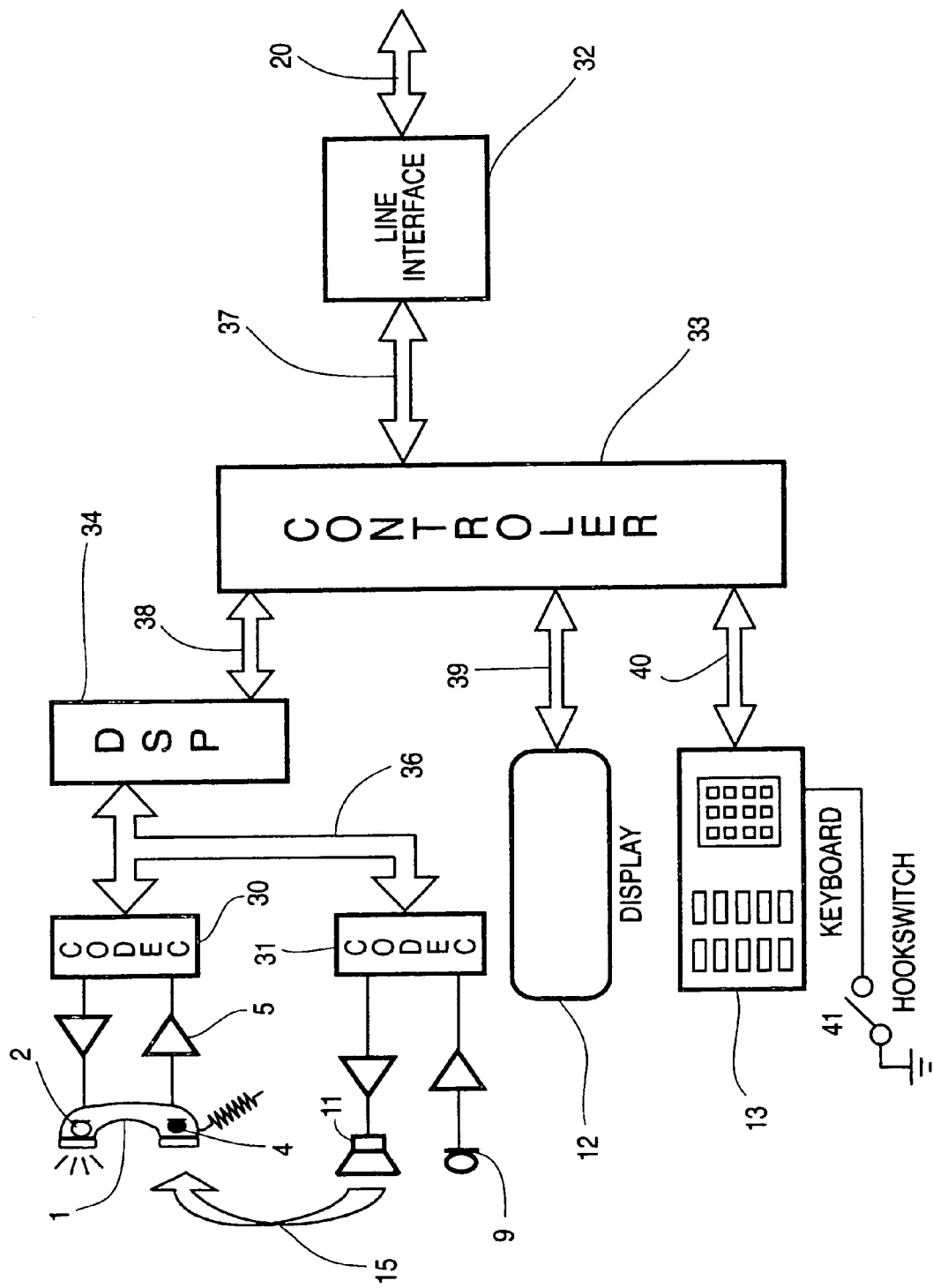
FIG. 1 is a block diagram for a typical telephone.

Attention is first directed to FIG. 1, showing a block diagram of a typical telephone. For illustration purposes, many blocks are shown. In an actual implementation, however, they could comprise either a plurality of devices or a device which incorporates a plurality of blocks. Similarly, the busses 36, 37, 38, 39, 40 may either all be separate busses, or be combined together as the designer sees fit.

For purposes of the present disclosure, the line 20 and its interface 32 can either be analogue PSTN, digital TDM, wireless, switched packet (e.g. VoIP, ATM) or any other voice carrier line interface.

Typically, the controller 33 directs either or both voice channels to the line interface 32 via the audio bus 36 to and from the appropriate transducers and processing. The DSP 34 typically provides volume control, speakerphone functionality, tone generation, and other necessary functionality for the operation of the telephone.

Figure 2:
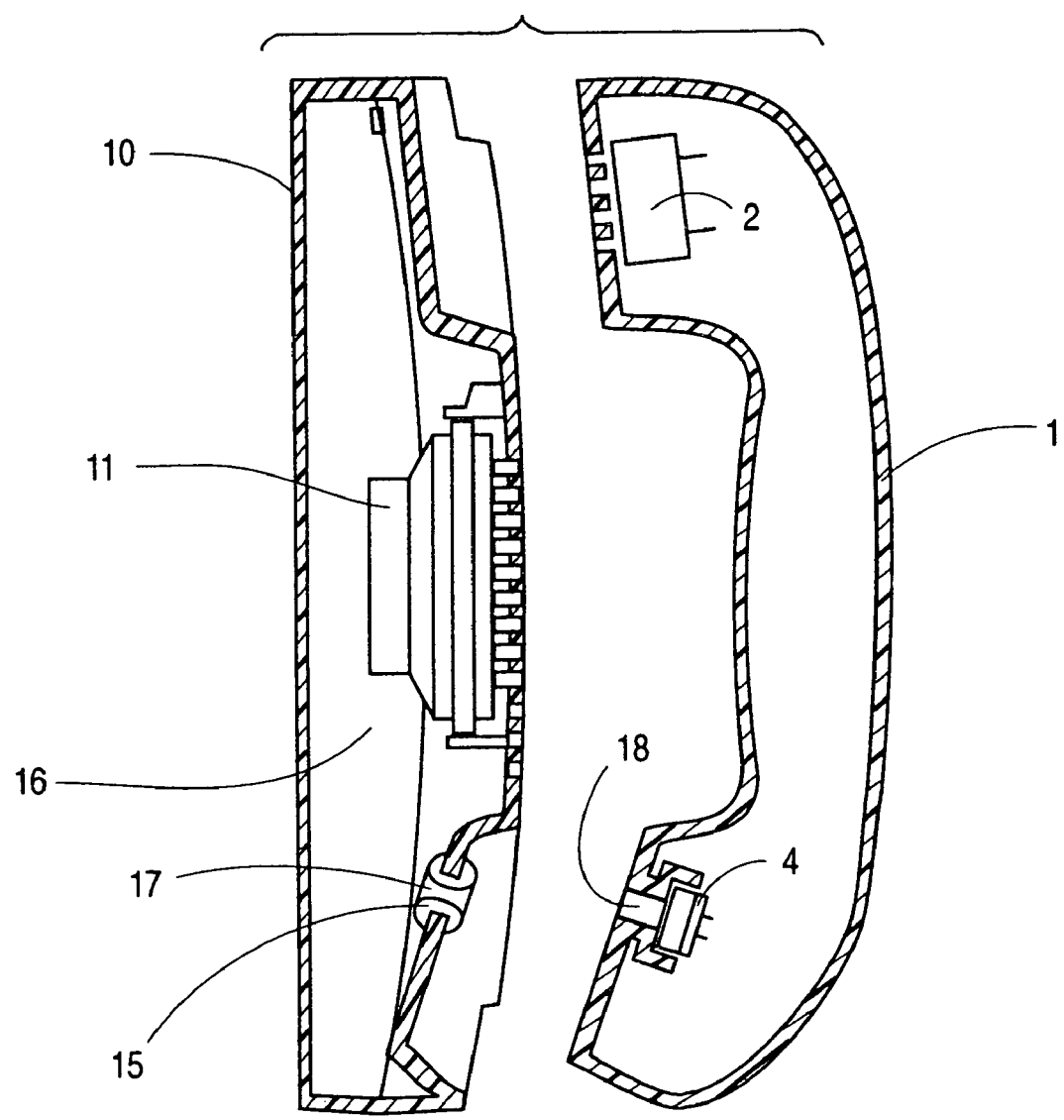
FIG. 2 is a simplified sectional view through a handset and a loudspeaker cavity, showing the location of the essential components.

In FIG. 2, functional blocks are illustrated to help understand the operation of the invention. In this figure, the handset 1 has a microphone 4 which is acoustically coupled through an acoustically designed waveguide 15 to the cavity 16 in the speaker set 10 where the loud speaker 11 is housed. The resulting signal generated by the microphone is amplified by the handset microphone preamplifier 5, passes to its CODEC 30 and is sent to the DSP 34 via the audio bus 36. As stated above, the acoustical waveguide 15 is the only component not already found in current telephones. This waveguide, in its simplest form, would be a soft elastomeric grommet dressing a hole 17 that lines up with the handset microphone port 18.

Within the DSP function 34, appropriate algorithms are implemented that compensate for the actual loud speaker 11 performance within the set 10. These algorithms typically modify the receive signal from the line 20 before they are sent out to the speaker CODEC 31.

The following are possible algorithms that could utilize this type of signal to advantage:

1. Loudspeaker Linearisation

In this implementation, the microphone signal is used to correct the loudspeaker's frequency response and possible non-linearities. One has to determine, a priori, the transfer function between the desired acoustic signal (usually at 0.5 m in the position described in ITU P.340) and the sound pressure in the loudspeaker cavity. This transfer function is further coloured by the frequency response of the handset microphone 4 and the acoustic waveguide 15. By applying the inverse of this transfer function to the microphone signal, one can then use this signal as a feed-back signal to control an adaptive filter which will compensate for any deviations. This will compensate for loudspeaker variations, and for loudspeaker and circuitry non-linearities, and could enhance the performance of the loudspeaker (e.g. bass boost). Making the enclosure less critical may reduce the cost of the enclosure.

2. Acoustic Echo Canceller Control Signal

Figure 3:
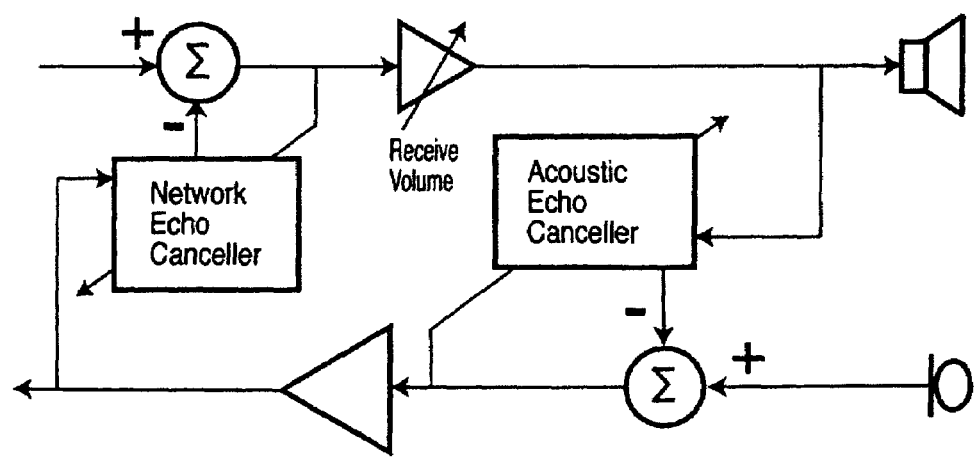
FIG. 3 is a simplified block diagram of a typical speakerphone set.

In a conventional full-duplex speakerphone, the loudspeaker and its driver are assumed to have perfectly linear characteristics. In the design of the set, much attention is paid to ensure that this assumption is in fact reasonably correct. Within the algorithm the signal is limited so as to be well below any circuitry non-linearity (e.g. below clipping), thus reducing the dynamic range or pre-distortion of the signal (illustrated in FIG. 3).

Figure 4:
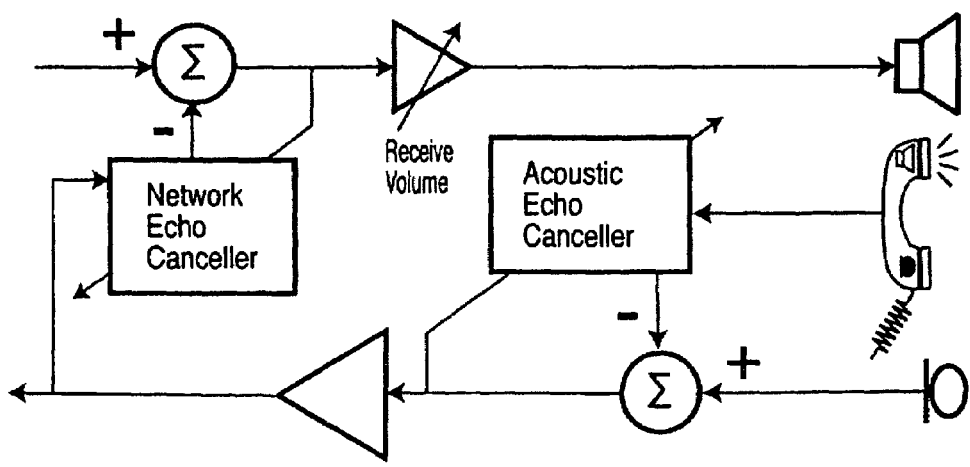
FIG. 4 is a modified block diagram illustrating the use of the handset signal as the control signal for an acoustic echo canceller.

Using the actual end receive signal would solve these problems. In this implementation, if we use the handset microphone signal and correct it as described above, we will have a very close approximation to the real signal (see FIG. 4). One now has a control signal that is linearly related to the real receive signal and to the receive signal that the handsfree microphone sees. (The echo canceller is trying to estimate the room impulse response based on the receive signal. In order to do this reasonably successfully, perfect linearity must be assumed.) If significant set non-linearities occur, such as buzzing or rattling, the handset microphone will also pick this up and they will not destabilise the echo canceller.

3. Microphone to Speaker Separation Enhancement

In Canadian Patent Application No. 2,229,424, a secondary microphone was placed in the cavity of the telephone set. The signal from this microphone was used to increase the separation between the loudspeaker signal and the handsfree microphone. The major drawbacks were cost and the fact that this solution was approximate (varied from set to set). By the use of the handset microphone coupled to the speaker cavity as described above, it is now possible to implement this idea with greater success. Specifically, the analogue circuit described in the disclosure of Robert McLeod can be utilized. However, the use of digital adaptive filters provides better performance without any extra parts costs.

4. Double Talk Detection Enhancement

A more efficient double talk detector is made possible by this development. In single talk receive, the signal between the handset microphone and the hands-free microphone will be perfectly correlated except for the room ambient noise. In single talk transmit, they will also be highly correlated as the handset microphone can still (to a significantly lesser extent) capture the ambient acoustical noise. However, in doubletalk, the correlation will significantly degrade as the receive signal will dominate the handset microphone signal and the talker in the room should significantly affect the hands-free microphone signal. Accurate estimation of the double talk condition is critical to a stable acoustic echo canceller.

OTHER VARIATIONS

In an analogue set, the signals could be processed using analogue circuitry. This would likely prove to be less cost effective, but is well within the intent of the present developments.

As well, it is expected that the use of this device would improve implementation of an ultrasonic hook switch, as set forth in Mitel U.K. patent application filed Sep. 7, 2000.

Algorithms used in the performance enhancements described above can be enabled when the hookswitch detection signal 41 (FIG. 1) dictates to the software running in controller 33 that the handset is in its cradle. This is important to note because the user of the handset could press a speakerphone button on the keyboard 13, while holding the handset. The software implements the enhancing algorithms only when the handset has been returned to its cradle (as indicated by the hookswitch signal 41). This ensures stable algorithm handling within the DSP 34.

While one embodiment of the present invention has been illustrated in the accompanying drawings and described herein above, it will be evident to those skilled in the art that changes and modifications may be made therein without departing from the essence of the present invention, as set forth in the appended claims.

The embodiments of the invention in which an exclusive property or privilege is claimed are defined as follows:

1. In a speakerphone having a portion defining a loudspeaker cavity
   containing a loudspeaker, the speakerphone including a handset having an internal microphone, said portion defining means for receiving the handset, the improvement comprising:
   detecting when said handset is received within said portion of the speakerphone,
   acoustically coupling the handset microphone to said loudspeaker cavity, and using the resulting handset microphone signal only upon detection of such handset being received within said portion of the speakerphone to control feed-back or feed-forward algorithms that enhance the performance of the speakerphone.

2. In a speakerphone having a portion defining a loudspeaker cavity containing a loudspeaker, the speakerphone including a handset with a handset cavity enclosing an internal microphone, said portion defining registry means for receiving the handset, the improvement comprising:
   coupling means for acoustically coupling the microphone to said loudspeaker cavity whenever the handset is received by said registry means,
   and a hookswitch for detecting when said handset is received within said registry means and in response, enabling use of the resulting handset microphone signal to control feed-back or feed-forward algorithms that enhance the performance of the speakerphone.

3. The improvement claimed in claim 2, in which said loudspeaker cavity is defined at least in part by a wall, and in which said coupling means comprises an opening through said wall which is aligned with said internal microphone when the handset is received by said registry means.

4. The improvement claimed in claim 3, in which the coupling means further comprises an elastomeric grommet dressing the hole, the grommet extending sufficiently far from the wall to contact the handset when the latter is received by said registry means, thus dampening handset movement and minimizing the risk that use of the loudspeaker will cause the handset to rattle.

5. A speakerphone comprising:
   a portion defining a loudspeaker cavity,
   a loudspeaker within said cavity,
   a handset,
   an internal microphone in the handset,
   means on said portion for receiving the handset,
   coupling means for acoustically coupling the handset microphone to said loudspeaker cavity, and a hookswitch for detecting when said handset is received within said portion of the speakerphone, and in response, enabling use of the resulting handset microphone signal to control feed-back or feed-forward algorithms that enhance the performance of the speakerphone.

6. The speakerphone claimed in claim 5, in which the handset defines a handset cavity containing said handset microphone.

7. The speakerphone claimed in claim 5, in which said loudspeaker cavity is defined at least in part by a wall, and in which said coupling means comprises an opening through said wall which is aligned with said internal microphone when the handset is received by said registry means.

8. The speakerphone claimed in claim 7, in which the coupling means further comprises an elastomeric grommet dressing the hole, the grommet extending sufficiently far from the wall to contact the handset when the latter is received by said registry means, thus dampening handset movement and minimizing the risk that use of the loudspeaker will cause the handset to rattle.

9. For a speakerphone having a portion defining a loudspeaker cavity
   containing a loudspeaker, the speakerphone including a handset having an internal microphone, said portion defining receiving means for receiving the handset, a method of exerting control over at least one aspect of the circuitry of the speakerphone, comprising acoustically coupling the microphone to said loudspeaker cavity whenever the handset is received by the receiving means, detecting when said handset is received by the receiving means and in response, using the resultant microphone signal to exert the control.

10. For use with a speakerphone having a portion defining a loudspeaker cavity containing a loudspeaker, the speakerphone including a handset with a handset cavity enclosing an internal microphone, said portion of the speakerphone defining receiving means for receiving the handset:
    a method of controlling at least one aspect of the circuitry of the speakerphone, comprising acoustically coupling the microphone to said loudspeaker cavity whenever the handset is received by the receiving means, detecting when said handset is received by the receiving means and in response, using the resultant microphone signal to control feed-back or feed-forward algorithms that enhance the performance of the speakerphone.

11. The method claimed in claim 9, in which said loudspeaker cavity is defined at least in part by a wall, and in which said coupling comprises aligning an opening through said wall with said internal microphone when the handset is received by said receiving means.

12. The method claimed in claim 11, in which the coupling means further comprises an elastomeric grommet dressing the opening, the grommet extending sufficiently far from the wall to contact the handset when the handset is received by said receiving means, thus dampening handset movement and minimizing the risk that use of the loudspeaker will cause the handset to rattle.

* * * * *